US012243492B2

(12) United States Patent
Kodama et al.

(10) Patent No.: US 12,243,492 B2
(45) Date of Patent: Mar. 4, 2025

(54) DISPLAY DEVICE AND ELECTRONIC DEVICE

(71) Applicant: SEIKO EPSON CORPORATION, Tokyo (JP)

(72) Inventors: Takumi Kodama, Chino (JP); Takeshi Koshihara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/411,528

(22) Filed: Jan. 12, 2024

(65) Prior Publication Data

US 2024/0242678 A1 Jul. 18, 2024

(30) Foreign Application Priority Data

Jan. 13, 2023 (JP) ................................ 2023-003591

(51) Int. Cl.
*G09G 3/3266* (2016.01)
*G09G 3/32* (2016.01)
*G09G 3/3275* (2016.01)

(52) U.S. Cl.
CPC ............. *G09G 3/3266* (2013.01); *G09G 3/32* (2013.01); *G09G 3/3275* (2013.01); *G09G 2310/0267* (2013.01); *G09G 2310/0275* (2013.01)

(58) Field of Classification Search
CPC .. G09G 3/3233; G09G 3/3266; G09G 3/3275; G09G 3/32; G09G 2310/0267; G09G 2310/0275
See application file for complete search history.

(56) References Cited

U.S. PATENT DOCUMENTS 11,715,740 B2 * 8/2023 Kawashima .......... G09F 27/005 349/43
11,769,458 B2 * 9/2023 Yang .................... G09G 3/3258 345/694
11,785,807 B2 * 10/2023 Han ..................... H10K 59/122 257/89
11,790,837 B2 * 10/2023 Kwag ...................... G09G 3/32 345/694
11,798,491 B2 * 10/2023 Ikeda ................ H01L 29/78696
(Continued)

FOREIGN PATENT DOCUMENTS

JP 2006-189756 A 7/2006
JP 2016-075868 A 5/2016
(Continued)

*Primary Examiner* — Vinh T Lam
(74) *Attorney, Agent, or Firm* — Oliff PLC

(57) ABSTRACT

A display device includes a scanning line, a first data line and a second data line, a first transistor circuit, a second transistor circuit, a first light emitting element including a first pixel electrode, and a second light emitting element including a second pixel electrode, wherein the first transistor circuit includes a first drive transistor and a first selection transistor, the second transistor circuit includes a second drive transistor and a second selection transistor, the first pixel electrode and the second pixel electrode are arranged in the second direction, the first transistor circuit and the second transistor circuit are arranged in the first direction, and a gate included in the first selection transistor and a gate included in the second selection transistor are electrically coupled to the scanning line.

5 Claims, 6 Drawing Sheets

(56) References Cited

U.S. PATENT DOCUMENTS

2006/0145964 A1 7/2006 Park et al.
2010/0309174 A1* 12/2010 Tomida ................ G09G 3/3233 345/204
2011/0134101 A1* 6/2011 Yamashita ........... G09G 3/3233 345/212
2011/0221789 A1* 9/2011 Ota ...................... G09G 3/3266 345/690
2014/0043219 A1* 2/2014 Ota ...................... H10K 59/128 345/80
2016/0104413 A1 4/2016 Matsueda et al.
2016/0125805 A1* 5/2016 Yamashita ........... G09G 3/3233 345/77
2016/0307507 A1* 10/2016 Nakamura ........... G09G 3/3266
2018/0219050 A1 8/2018 Ota et al.
2018/0261155 A1* 9/2018 Ota ........................ H10K 50/82
2020/0051501 A1* 2/2020 Atsuchi ................ H10K 59/123
2020/0185420 A1* 6/2020 Ikeda .................. H01L 27/1225
2020/0235173 A1 7/2020 Nakamura
2021/0335244 A1* 10/2021 Ohara ...................... G09G 3/32
2023/0069464 A1* 3/2023 Ota ...................... G09G 3/2092
2023/0091789 A1* 3/2023 Momose ................ G09G 3/003 345/204
2023/0101721 A1* 3/2023 Kodama .............. G09G 3/3233 345/212
2023/0326407 A1* 10/2023 Irobe .................... G09G 3/3233
2024/0054930 A1* 2/2024 Long .................... G09G 3/3659
2024/0138169 A1* 4/2024 Kusunoki ............ H10K 59/131
2024/0194136 A1* 6/2024 Xiong .................. G09G 3/3233
2024/0212614 A1* 6/2024 Kubota ................ G09G 3/3233
2024/0215289 A1* 6/2024 Yamazaki .............. H05B 33/02

FOREIGN PATENT DOCUMENTS

JP 2018-124540 A 8/2018
JP 2018-151506 A 9/2018
WO 2019/026131 A1 2/2019
WO 2019/064564 A1 4/2019

* cited by examiner

DISPLAY DEVICE AND ELECTRONIC DEVICE

The present application is based on, and claims priority from JP Application Serial Number 2023-003591, filed Jan. 13, 2023, the disclosure of which is hereby incorporated by reference herein in its entirety.

BACKGROUND

1. Technical Field

The present disclosure relates to a display device and an electronic device.

2. Related Art

Display devices such as liquid crystal display devices and organic electroluminescent display devices are known. An example of such a device is an organic EL display device described in JP-A-2016-75868.

In the organic EL display device of JP-A-2016-75868, one rectangular pixel is configured by combining a plurality of sub-pixels, and the pixels are arranged in a matrix. Each sub-pixel is provided to correspond to an intersection of a data line extending in a column direction and a scanning line extending in a row direction. In addition, an anode electrode of a light emitting element, a switching transistor, and a drive transistor are provided within a region of each sub-pixel.

In the display device of JP-A-2016-75868, when the number of sub-pixels is increased to achieve higher resolution, the number of sub-pixels corresponding to one scanning line increases. For this reason, one horizontal scanning period is reduced. As a result, there is a problem of deterioration in display quality. Further, as progress to a higher driving frame rate is made, the problem becomes more significant.

SUMMARY

In order to solve the above problems, a display device according to a preferred aspect of the present disclosure includes a scanning line extending in a first direction, a first data line and a second data line that extend in a second direction intersecting the first direction and that are arranged in the first direction, a first transistor circuit, a second transistor circuit, a first light emitting element including a first pixel electrode, and a second light emitting element including a second pixel electrode, wherein the first transistor circuit includes a first drive transistor configured to supply the first pixel electrode with a first drive current based on a potential corresponding to a first video signal from the first data line, and a first selection transistor configured to electrically couple the first data line to the first drive transistor, the second transistor circuit includes a second drive transistor configured to supply the second pixel electrode with a second drive current based on a potential corresponding to a second video signal from the second data line, and a second selection transistor configured to electrically couple the second data line to the second drive transistor, the first pixel electrode and the second pixel electrode are arranged in the second direction, the first transistor circuit and the second transistor circuit are arranged in the first direction, and a gate included in the first selection transistor and a gate included in the second selection transistor are electrically coupled to the scanning line.

DESCRIPTION OF EMBODIMENTS

Figure 1:
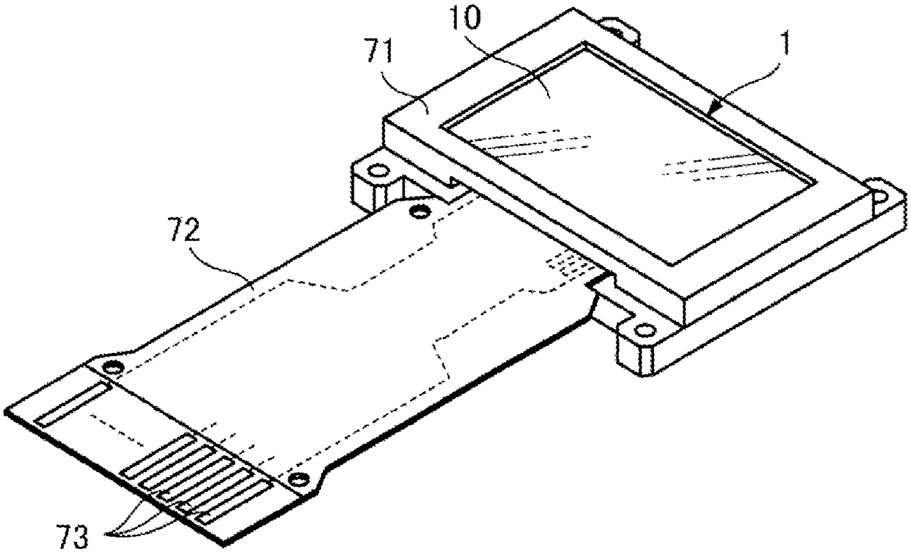
FIG. 1 is a diagram showing a display device according to a first embodiment.

Preferred embodiments according to the present disclosure will be described below with reference to the accompanying drawings. In addition, in the drawings, dimensions and scales of each part are appropriately made different from actual ones, and some parts are shown schematically to make them easier to understand. Also, the scope of the present disclosure is not limited to these forms unless the present disclosure is specifically described as being limited in the following description.

A. First Embodiment

1. Basic Configuration of Display Device 1

FIG. 1 is a diagram showing a display device 1 according to a first embodiment. The display device 1 shown in FIG. 1 is, for example, a micro-display that displays images on a head-mounted display. Also, the display device 1 is, for example, an organic EL device including an OLED. OLED is an abbreviation for Organic Light emitting Diode. EL is an abbreviation of Electroluminescence. In this embodiment, the display device 1 can display full-color images. In addition, the images include those only displaying text information. Further, the display device 1 may be a device that can display only a single color.

The display device 1 includes a display panel 10 that displays images and is housed in a frame-shaped case 71 that opens at the display panel 10. One end of an FPC board 72 is coupled to the display device 1. FPC is an abbreviation for Flexible Printed Circuit. A plurality of terminals 73 for coupling a host device (not shown) are provided to the other end of the FPC board 72. When the plurality of terminals 73 are coupled to the host device, various signals are supplied to the display device 1 from the host device via the FPC board 72.

2. Configuration of Display Device 1

Figure 2:
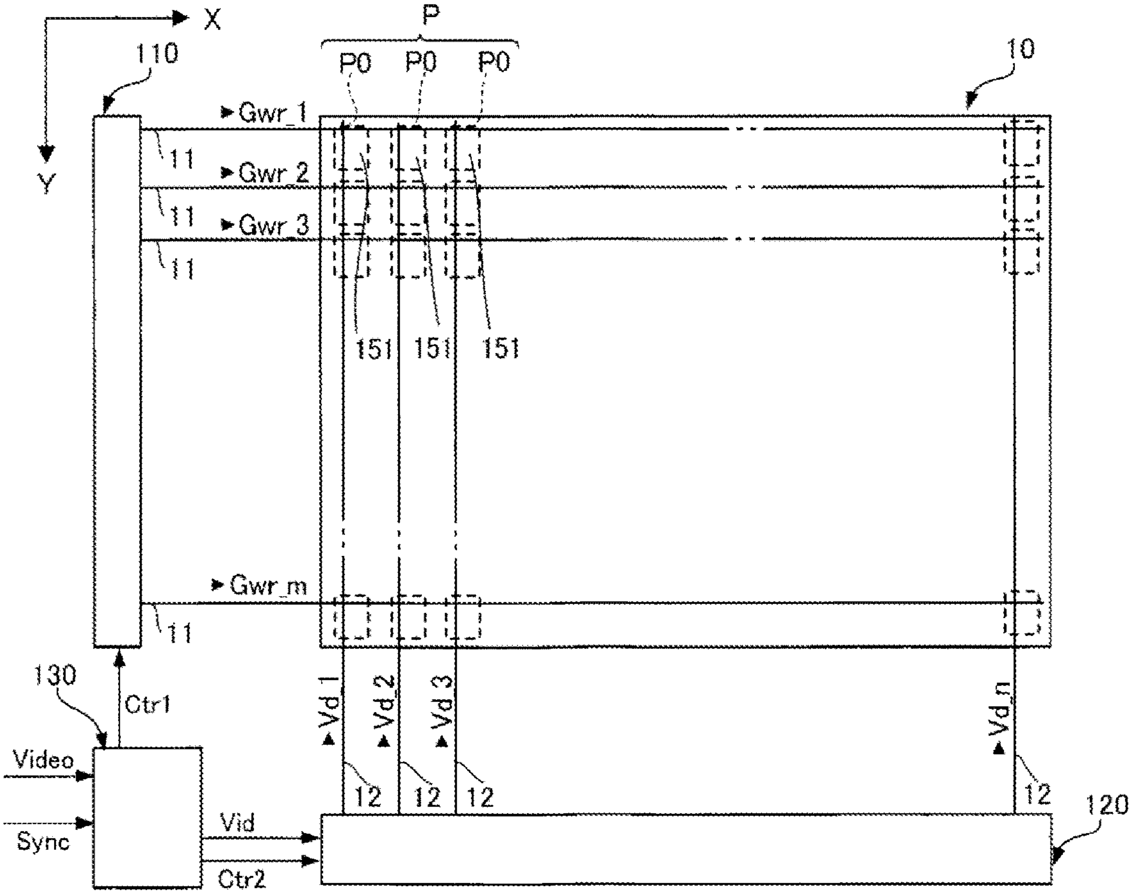
FIG. 2 is a diagram schematically showing the display device of FIG. 1.

FIG. 2 is a diagram schematically showing the display device 1 of FIG. 1. Also, the following description will be made using an X direction and a Y direction appropriately for convenience of explanation. An axis extending in the X direction and an axis extending in the Y direction are orthogonal to each other. The X direction is a "first direction" and a "row direction", and the Y direction is a "second direction" and a "column direction".

As shown in FIG. 2, the display device 1 includes the display panel 10, a control circuit 130, a scanning line drive circuit 110, and a data line drive circuit 120. The display panel 10, the control circuit 130, the scanning line drive circuit 110, and the data line drive circuit 120 are formed at a semiconductor substrate such as a silicon substrate, for example.

The display panel 10 is provided with m scanning lines 11 extending in the X direction and n data lines 12 extending in the Y direction. A plurality of display pixels P0 are provided to correspond to intersections of a plurality of scanning lines 11 and a plurality of data lines 12. Also, for example, a pixel P representing one dot of a color image is configured for every three display pixels P0 arranged in the X direction. In this embodiment, an arrangement of pixels P is a so-called RGB stripe arrangement. In addition, each display pixel P0 is provided with a pixel electrode 151 included in a light emitting element 15, which will be described later.

The control circuit 130 controls image display. Digital video data Video output from a host device (not shown) is supplied to the control circuit 130 shown in FIG. 2 in synchronization with a synchronization signal Sync. The control circuit 130 controls each part of the display device 1 based on the video data Video and the synchronization signal Sync. The video data Video specifies a gradation level of the display pixel P0 in an image to be displayed using, for example, 8 bits. Further, the synchronization signal Sync is a signal including a vertical synchronization signal that instructs to start vertical scanning of the video data Video, a horizontal synchronization signal that instructs to start horizontal scanning thereof, and a dot clock signal.

The control circuit 130 generates a control signal Ctr1 based on the synchronization signal Sync and supplies the control signal Ctr1 to the scanning line drive circuit 110, and generates a control signal Ctr2 based on the synchronization signal Sync and supplies the control signal Ctr2 to the data line drive circuit 120. Each of the control signals Ctr1 and Ctr2 includes a plurality of signals such as a pulse signal, a clock signal, and an enable signal.

Further, the control circuit 130 generates video data Vid based on the video data Video and supplies the video data Vid to the data line drive circuit 120. Brightness characteristics may not match between a gradation level indicated by the video data Vid and the light emitting element 15, which will be described later. Thus, in order to cause the light emitting element 15 to emit light at a brightness corresponding to the gradation level indicated by the video data Video, the control circuit 130 generates the video data Vid obtained by changing the 8 bits of the video data Video to 10 bits, for example.

In addition, the control circuit 130 is supplied with electric power from a power supply circuit (not shown) and supplies a power supply potential to the scanning line drive circuit 110, the data line drive circuit 120, and a plurality of transistor circuits 20, which will be described later, included in the display panel 10.

The scanning line drive circuit 110 generates a scanning signal Gwr based on the control signal Ctr1. The scanning signal Gwr is a signal for sequentially selecting and scanning m rows of the scanning lines 11 every predetermined number of rows in each frame period V. The scanning line drive circuit 110 sequentially and exclusively selects one or more scanning lines 11 from the m rows of the scanning lines 11 for each horizontal scanning period H included in each frame period V, and selects a display pixel P0 to which a video signal Vd is written from among the plurality of display pixels P0. Further, in FIG. 2, the scanning signals Gwr supplied to 1st, 2nd, 3rd, . . . , and m-th rows of the scanning lines 11 are expressed as Gwr_1, Gwr_2, Gwr_3, . . . , and Gwr_m.

Also, the above-described frame period V indicates a period required for the display device 1 to display one cut of images. A length of the frame period V is, for example, 1/60 second when a driving frame rate is 60 Hz. One frame period V includes the horizontal scanning period H and a light emission period corresponding to each row. The light emission period is a period during which the light emitting element 15 emits light. One horizontal scanning period H is a period required for horizontal scanning of one row. One horizontal scanning period H includes a writing period in which the video signal Vd is written to the display pixel P0. Further, the number of scanning lines 11 selected in one horizontal scanning period H is not limited to one row and may be two or more rows.

The data line drive circuit 120 supplies video signals Vd to the transistor circuits 20, which will be described later, corresponding to the display pixels P0 provided in the row selected by the scanning line drive circuit 110. Also, in FIG. 2, the video signals Vd supplied to the data lines 12 in the 1st, 2nd, 3rd, . . . , and n-th rows are expressed as Vd_1, Vd_2, Vd_3, . . . , and Vd_n.

3. Arrangement of Display Pixels P0

Figure 3:
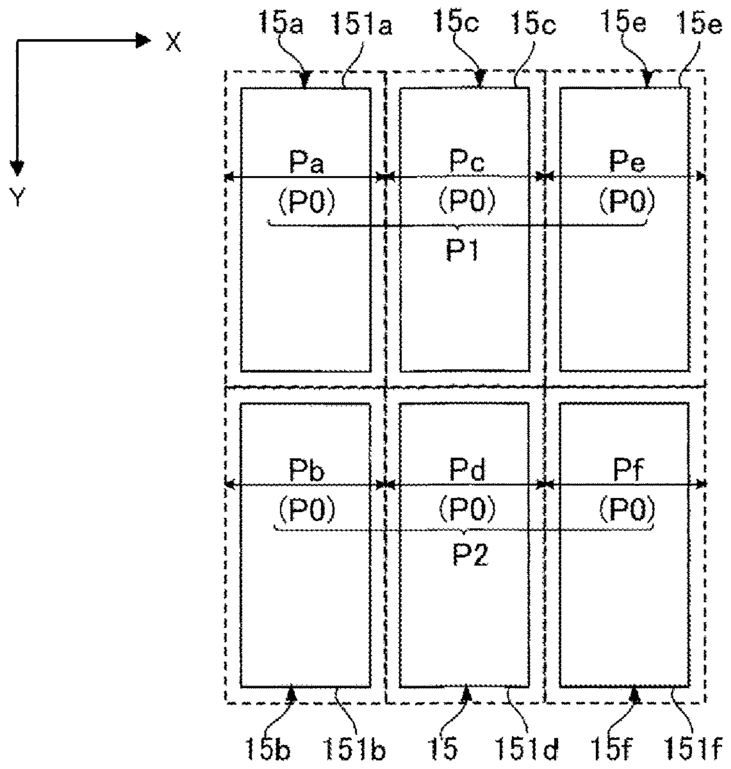
FIG. 3 is a diagram showing two arbitrary pixels among a plurality of pixels in FIG. 1.

FIG. 3 is a diagram showing two arbitrary pixels P among the plurality of pixels P in FIG. 1. FIG. 3 shows two arbitrary pixels P among the plurality of pixels P. One pixel P is defined as a first pixel P1 and the other pixel P is defined as a second pixel P2. The second pixel P2 is provided in the Y direction with respect to the first pixel P1.

Each of the first pixel P1 and the second pixel P2 has three display pixels P0. Specifically, the first pixel P1 has a first display pixel Pa, a third display pixel Pc, and a fifth display pixel Pe. The first display pixel Pa, the third display pixel Pc, and the fifth display pixel Pe are arranged in the X direction. Also, the second pixel P2 has a second display pixel Pb, a fourth display pixel Pd, and a sixth display pixel Pf. The second display pixel Pb, the fourth display pixel Pd, and the sixth display pixel Pf are arranged in the X direction. The first display pixel Pa and the second display pixel Pb emit light in a red wavelength band, for example. The third display pixel Pc and the fourth display pixel Pd emit light in a green wavelength band, for example. The fifth display pixel Pe and the sixth display pixel Pf emit light in a blue wavelength band, for example.

The pixel electrode 151 is provided in each display pixel P0. Similarly to the plurality of display pixels P0 being disposed in a matrix, a plurality of pixel electrodes 151 are disposed in a matrix. Also, although not shown, each of the display pixels P0 is provided with a light emitting region having substantially the same planar area and substantially the same planar shape as the pixel electrodes 151. Light is emitted from the light emitting region.

The first display pixel Pa is provided with a first pixel electrode 151*a*. The third display pixel Pc is provided with a third pixel electrode 151*c*. The fifth display pixel Pe is provided with a fifth pixel electrode 151*e*. In addition, the second display pixel Pb is provided with a second pixel electrode 151*b*. The fourth display pixel Pd is provided with a fourth pixel electrode 151*d*. The fifth display pixel Pe is provided with a fifth pixel electrode 151*e*. The sixth display pixel Pf is provided with a sixth pixel electrode 151*f*.

The third pixel electrode 151*c* is provided in the X direction with respect to the first pixel electrode 151*a*. The fifth pixel electrode 151*e* is provided in the X direction with respect to the third pixel electrode 151*c*. In addition, the second pixel electrode 151*b* is provided in the Y direction with respect to the first pixel electrode 151*a*. The fourth pixel electrode 151*d* is provided in the Y direction with respect to the third pixel electrode 151*c* and is provided in the X direction with respect to the second pixel electrode 151*b*. The sixth pixel electrode 151*f* is provided in the Y direction with respect to the fifth pixel electrode 151*e* and is provided in the X direction with respect to the fourth pixel electrode 151*d*.

4. Arrangement of Transistor Circuits 20

Figure 4:
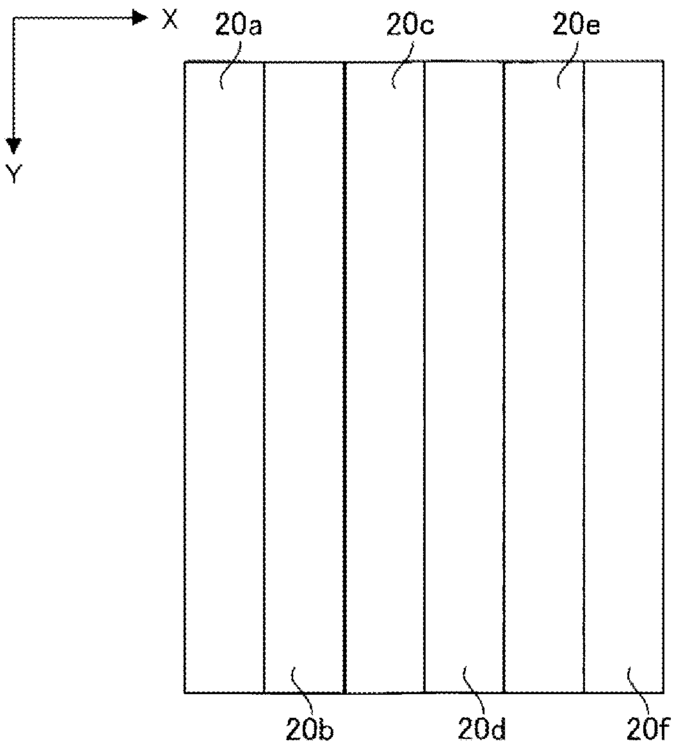
FIG. 4 is a layout diagram of six transistor circuits corresponding to six display pixels shown in FIG. 3.

FIG. 4 is a layout diagram of six transistor circuits 20 corresponding to six display pixels P0 shown in FIG. 3. In FIG. 4, a first transistor circuit 20*a*, a second transistor circuit 20*b*, a third transistor circuit 20*c*, a fourth transistor circuit 20*d*, a fifth transistor circuit 20*e*, and a sixth transistor circuit 20*f* are shown as the six transistor circuits 20.

The first transistor circuit 20*a* corresponds to the first display pixel Pa. The second transistor circuit 20*b* corresponds to the second display pixel Pb. The third transistor circuit 20*c* corresponds to the third display pixel Pc. The fourth transistor circuit 20*d* corresponds to the fourth display pixel Pd. The fifth transistor circuit 20*e* corresponds to the fifth display pixel Pe. The sixth transistor circuit 20*f* corresponds to the sixth display pixel Pf.

The first transistor circuit 20*a*, the second transistor circuit 20*b*, the third transistor circuit 20*c*, the fourth transistor circuit 20*d*, the fifth transistor circuit 20*e*, and the sixth transistor circuit 20*f* are arranged in order in the X direction.

Although not shown in detail, the first transistor circuit 20*a* and the second transistor circuit 20*b* overlap the first display pixel Pa and the second display pixel Pb in a plan view. With such an arrangement, the problem of an electrical coupling path between the first transistor circuit 20*a* and the first pixel electrode 151*a* becoming excessively long and excessively complicated is inhibited. Also, the same applies to the second transistor circuit 20*b*. In addition, the plan view indicates viewing in a direction orthogonal to both the X direction and the Y direction.

Similarly, although not shown in detail, the third transistor circuit 20*c* and the fourth transistor circuit 20*d* overlap the third display pixel Pc and the fourth display pixel Pd in a plan view. With such an arrangement, the problem of an electrical coupling path between the third transistor circuit 20*c* and the third pixel electrode 151*c* becoming excessively long and excessively complicated is inhibited. Also, the same applies to the fourth transistor circuit 20*d*. In addition, the fifth transistor circuit 20*e* and the sixth transistor circuit 20*f* overlap the fifth display pixel Pe and the sixth display pixel Pf in a plan view. With such an arrangement, the problem of an electrical coupling path between the fifth transistor circuit 20*e* and the fifth pixel electrode 151*e* becoming excessively long and excessively complicated is inhibited. Also, the same applies to the sixth transistor circuit 20*f*.

5. Configuration of Transistor Circuits 20

Figure 5:
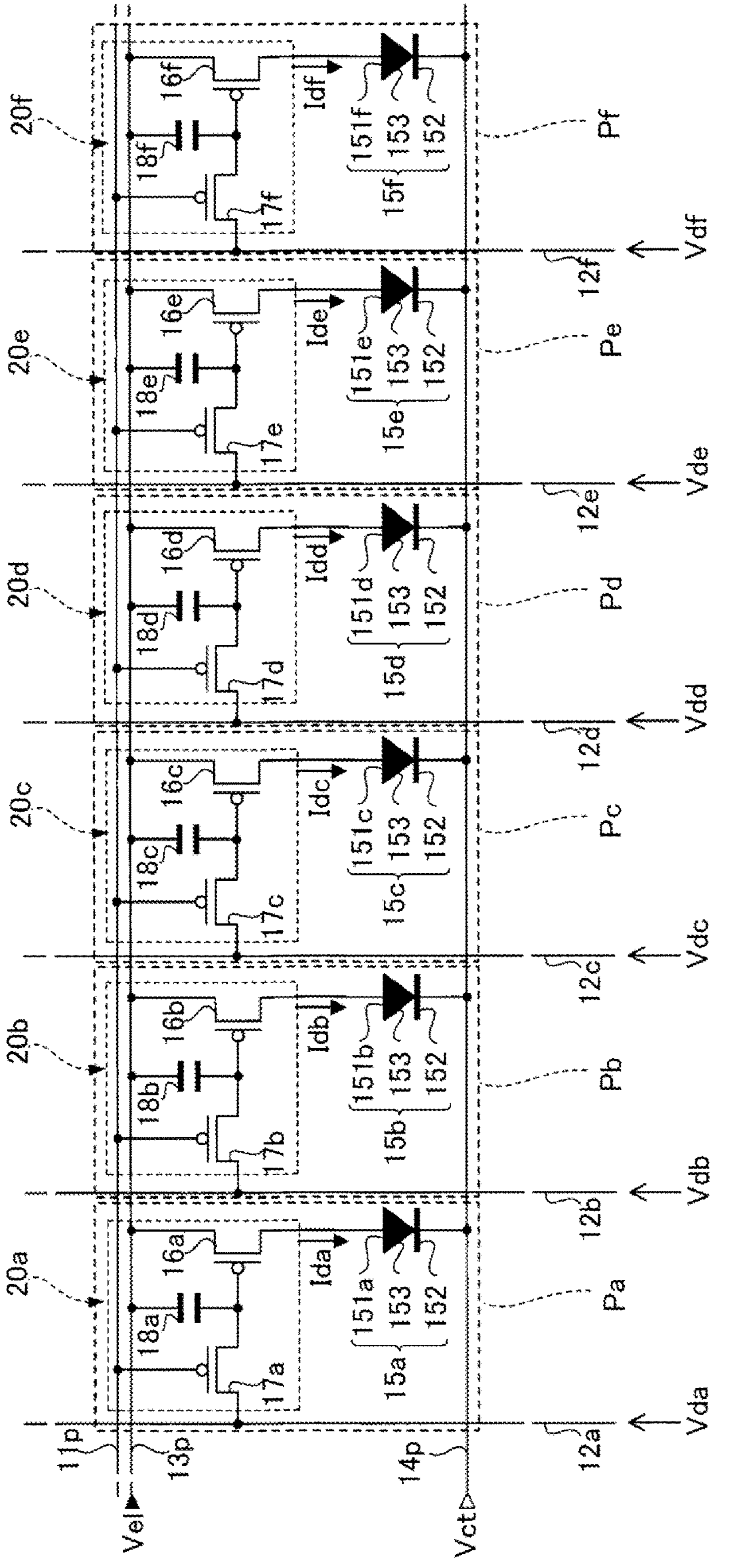
FIG. 5 is a diagram showing the six transistor circuits of FIG. 4.

FIG. 5 is a diagram showing the six transistor circuits 20 of FIG. 4. As shown in FIG. 5, the first transistor circuit 20*a* includes a first light emitting element 15*a*, a first drive transistor 16*a*, a first selection transistor 17*a*, and a first capacitive element 18*a*.

The first light emitting element 15*a* includes the first pixel electrode 151*a*, a common electrode 152, and a light emitting layer 153. Also, the common electrode 152 is common to first to sixth light emitting elements 15*a* to 15*f*. The light emitting layer 153 is common to the first to sixth light emitting elements 15*a* to 15*f*, but may be provided individually.

The first light emitting element 15*a* is disposed on a path that couples a first constant potential wiring 13*p* and a second constant potential wiring 14*p*. A higher potential Vel is supplied to the first constant potential wiring 13*p* from a power supply circuit (not shown). A lower potential Vct is supplied to the second constant potential wiring 14*p* from the power supply circuit. Also, the first light emitting element 15*a* is, for example, an OLED. The light emitting layer 153 includes a light emitting material and is interposed between the first pixel electrode 151*a* and the common electrode 152. The first pixel electrode 151*a* functions as an anode electrode, and the common electrode 152 functions as a cathode electrode. In such a first light emitting element 15*a*, holes supplied from the first pixel electrode 151*a* and electrons supplied from the common electrode 152 are recombined in the light emitting layer 153. Due to the recombination, the light emitting layer 153 emits light.

The first drive transistor 16*a* supplies the first pixel electrode 151*a* with a first drive current Ida based on a potential corresponding to a first video signal Vda supplied from a first data line 12*a* of the n data lines 12. The first drive transistor 16*a* is disposed in series with the first light emitting element 15*a*. One of a source and a drain of the first drive transistor 16*a* is electrically coupled to the first constant potential wiring 13*p*, and the other is electrically coupled to the first pixel electrode 151*a*.

The first selection transistor 17*a* electrically couples the first data line 12*a* to the first drive transistor 16*a*. Specifically, the first selection transistor 17*a* functions as a switch that controls conduction and non-conduction between the first data line 12*a* and a gate of the first drive transistor 16*a*. One of a source and a drain of the first selection transistor 17*a* is electrically coupled to the first data line 12*a*, and the other is electrically coupled to the gate of the first drive transistor 16*a*. A gate of the first selection transistor 17*a* is electrically coupled to one arbitrary scanning line 11*p* among the m scanning lines 11.

In the following, the second to sixth transistor circuit 20*b* to 20*f* will be described, but the description of items similar to those of the first transistor circuit 20*a* will be appropriately omitted.

The second transistor circuit 20*b* includes a second light emitting element 15*b*, a second drive transistor 16*b*, a second selection transistor 17*b*, and a second capacitive element 18*b*. The second light emitting element 15*b* includes the second pixel electrode 151*b*, the common electrode 152, and the light emitting layer 153. The second drive transistor 16*b* supplies the second pixel electrode 151*b* with a second drive current Idb based on a potential corresponding to a second video signal Vdb supplied from a second data line 12*b*. The second selection transistor 17*b* electrically couples the second data line 12*b* among the n data lines 12 to the second drive transistor 16*b*. A gate of the second selection transistor 17*b* is electrically coupled to the scanning line 11*p*.

The third transistor circuit 20*c* includes a third light emitting element 15*c*, a third drive transistor 16*c*, a third selection transistor 17*c*, and a third capacitive element 18*c*. The third light emitting element 15*c* includes the third pixel electrode 151*c*, the common electrode 152, and the light emitting layer 153. The third drive transistor 16*c* supplies the third pixel electrode 151*c* with a third drive current Idc based on a potential corresponding to a third video signal Vdc supplied from a third data line 12*c*. The third selection transistor 17*c* electrically couples the third data line 12*c* among the n data lines 12 to the third drive transistor 16*c*. A gate of the third selection transistor 17*c* is electrically coupled to the scanning line 11*p*.

The fourth transistor circuit 20*d* includes a fourth light emitting element 15*d*, a fourth drive transistor 16*d*, a fourth selection transistor 17*d*, and a fourth capacitive element 18*d*. The fourth light emitting element 15*d* includes the fourth pixel electrode 151*d*, the common electrode 152, and the light emitting layer 153. The fourth drive transistor 16*d* supplies the fourth pixel electrode 151*d* with a fourth drive current Idd based on a potential corresponding to a fourth video signal Vdd supplied from a fourth data line 12*d*. The fourth selection transistor 17*d* electrically couples the fourth data line 12*d* among the n data lines 12 to the fourth drive transistor 16*d*. A gate of the fourth selection transistor 17*d* is electrically coupled to the scanning line 11*p*.

The fifth transistor circuit 20*e* includes a fifth light emitting element 15*e*, a fifth drive transistor 16*e*, a fifth selection transistor 17*e*, and a fifth capacitive element 18*e*. The fifth light emitting element 15*e* includes the fifth pixel electrode 151*e*, the common electrode 152, and the light emitting layer 153. The fifth drive transistor 16*e* supplies the fifth pixel electrode 151*e* with a fifth drive current Ide based on a potential corresponding to a fifth video signal Vde supplied from a fifth data line 12*e*. The fifth selection transistor 17*e* electrically couples the fifth data line 12*e* among the n data lines 12 to the fifth drive transistor 16*e*. A gate of the fifth selection transistor 17*e* is electrically coupled to the scanning line 11*p*.

The sixth transistor circuit 20*f* includes a sixth light emitting element 15*f*, a sixth drive transistor 16*f*, a sixth selection transistor 17*f*, and a sixth capacitive element 18*f*. The sixth light emitting element 15*f* includes the sixth pixel electrode 151*f*, the common electrode 152, and the light emitting layer 153. The sixth drive transistor 16*f* supplies the sixth pixel electrode 151*f* with a sixth drive current Idf based on a potential corresponding to a sixth video signal Vdf supplied from a sixth data line 12*f*. The sixth selection transistor 17*f* electrically couples the sixth data line 12*f* among the n data lines 12 to the sixth drive transistor 16*f*. A gate of the sixth selection transistor 17*f* is electrically coupled to the scanning line 11*p*.

Also, the configuration of the transistor circuits 20 shown in FIG. 5 is an example, and a configuration other than that shown in FIG. 5 may be used. For example, the first transistor circuit 20*a* may further include another transistor that controls conduction between the first pixel electrode 151*a* and the first drive transistor 16*a*.

As described above, the first pixel electrode 151*a* and the second pixel electrode 151*b* shown in FIG. 3 are arranged in the Y direction. On the other hand, the first transistor circuit 20*a* and the second transistor circuit 20*b* shown in FIG. 4 are arranged in the X direction. Accordingly, the arrangement direction of the first transistor circuit 20*a* and the second transistor circuit 20*b* intersects the arrangement direction of the first pixel electrode 151*a* and the second pixel electrode 151*b*. In addition, the gate included in the first selection transistor 17*a* shown in FIG. 5 and the gate included in the second selection transistor 17*b* are electrically coupled to the same scanning line 11*p*. Further, either the source or the drain of the first selection transistor 17*a* and either a source or a drain of the second selection transistor 17*b* are electrically coupled to different data lines 12.

In known art, the transistor circuits 20 are disposed in a matrix, similarly to the arrangement of the pixel electrodes 151. For this reason, in known art, when the first pixel electrode 151*a* and the second pixel electrode 151*b* are arranged in the Y direction, the first transistor circuit 20*a* and the second transistor circuit 20*b* are arranged in the Y direction. Thus, the first transistor circuit 20*a* and the second transistor circuit 20*b* are electrically coupled to different scanning lines 11. Accordingly, in known art, two scanning lines 11 are required to control ON/OFF of the first selection transistor 17*a* and the second selection transistor 17*b*.

On the other hand, in this embodiment, the first pixel electrode 151*a* and the second pixel electrode 151*b* are arranged in the Y direction, whereas the first transistor circuit 20*a* and the second transistor circuit 20*b* are arranged in the X direction. For this reason, the gate of the first selection transistor 17*a* and the gate of the second selection transistor 17*b* are electrically coupled to the same scanning line 11*p*. Accordingly, the scanning line 11*p* for controlling ON/OFF of the first selection transistor 17*b* and the second selection transistor 17*b* is common. Thus, in known art, two scanning lines 11 are required, but in this embodiment, only one scanning line 11*p* is required. That is, the number of scanning lines 11 can be reduced to ½ as compared with the known configuration. For this reason, it is possible to make one horizontal scanning period H twice longer than one horizontal scanning period H in known art. Thus, deterioration in display quality due to shortening of one horizontal scanning period H can be inhibited. In particular, even when progress to a higher driving frame rate is made, one horizontal scanning period H sufficient for maintaining the display quality can be secured.

Also, as shown in FIG. 3, the third pixel electrode 151*c* is provided in the X direction with respect to the first pixel electrode 151*a*. The fourth pixel electrode 151*d* is provided in the X direction with respect to the second pixel electrode 151*b* and is provided in the Y direction with respect to the third pixel electrode 151*c*. The fifth pixel electrode 151*e* is provided in the X direction with respect to the third pixel electrode 151*c*. The sixth pixel electrode 151*f* is provided in the X direction with respect to the fourth pixel electrode 151*d* and is provided in the Y direction with respect to the fifth pixel electrode 151*e*. Accordingly, the first to sixth pixel electrodes 151*a* to 151*f* are arranged in two rows and three columns.

Also, as shown in FIG. 4, the third transistor circuit 20*c*, the fourth transistor circuit 20*d*, the fifth transistor circuit 20*e*, and the sixth transistor circuit 20*f* are arranged in the X direction, which is the same as the direction in which the scanning line 11*p* extends. Accordingly, the first to sixth transistor circuits 20*a* to 20*f* are arranged in one row and six columns. In addition, the gate of the third selection transistor 17*c*, the gate of the fourth selection transistor 17*d*, the gate of the fifth selection transistor 17*e*, and the gate of the sixth selection transistor 17*f* are electrically coupled to the scanning line 11*p*. Accordingly, each gate of the first to sixth selection transistors 17*a* to 17*f* is electrically coupled to the scanning line 11*p*. Thus, the scanning line 11*p* that controls ON/OFF of the first to sixth selection transistors 17*a* to 17*f* of the first to sixth transistor circuits 20*a* to 20*f* is common. Also, either sources or drains of the first to sixth selection transistors 17*a* to 17*f* are electrically coupled to different data lines 12.

According to this embodiment, while the six display pixels P0 are arranged in two rows and three columns, the six transistor circuits 20 are arranged in one row and six columns. Accordingly, the number of transistor circuits 20 arranged in the column direction can be halved as compared to the number of pixel electrodes 151 arranged in the column direction. That is, the number of transistor circuits 20 arranged can be halved as compared to the number of display pixels P0 arranged. Accordingly, as described above, one horizontal scanning period H can be secured to be twice longer than one horizontal scanning period H in known art. Thus, deterioration in display quality can be inhibited.

Also, the first pixel electrode 151*a*, the third pixel electrode 151*c*, and the fifth pixel electrode 151*e* form the first pixel P1 that forms one dot in color display. The second pixel electrode 151*b*, the fourth pixel electrode 151*d*, and the sixth pixel electrode 151*f* form the second pixel P2 that forms another dot in the color display. Thus, the transistor circuits 20 of the two pixels P arranged in the column direction are arranged in the row direction. In addition, the gates of the transistor circuits 20 included in the two pixels P arranged in the column direction are electrically coupled to the one scanning line 11*p*. According to such a configuration, regardless of the arrangement direction of the pixels P, as described above, the number of transistor circuits 20 arranged in the column direction can be halved as compared to the number of pixel electrodes 151 arranged in the column direction. Accordingly, as described above, one horizontal scanning period H can be secured to be twice longer than one horizontal scanning period H in known art. Thus, deterioration in display quality can be inhibited.

B. Second Embodiment

A second Embodiment will be described. Also, in each of the following examples, the reference numerals used in the description of the first embodiment will be used for elements whose functions are similar to those in the first embodiment, and each detailed description thereof will be appropriately omitted.

This embodiment is different from the first embodiment in the combination of the display pixels P0 included in one pixel P. The arrangement of the display pixels P0 in this embodiment is a so-called Bayer array.

Figure 6:
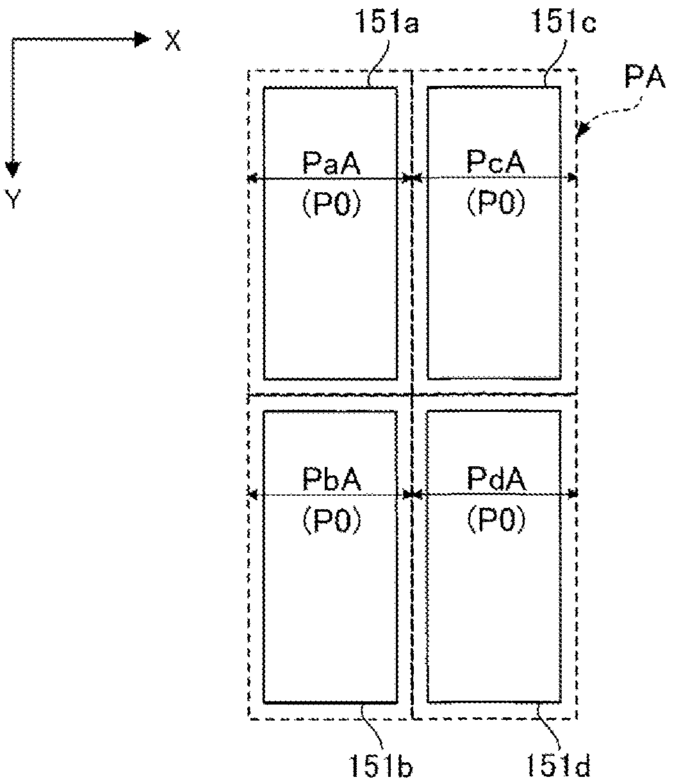
FIG. 6 is a diagram showing one pixel of a second embodiment.

FIG. 6 is a diagram showing one pixel P in the second embodiment. Also, FIG. 6 shows one arbitrary pixel PA among the plurality of pixels P.

As shown in FIG. 6, the pixel PA includes four display pixels P0. Specifically, the pixel PA includes a first display pixel PaA, a second display pixel PbA, a third display pixel PcA, and a fourth display pixel PdA. For example, the first display pixel PaA emits light in a red wavelength band. The second display pixel PbA emits light in a green wavelength band. The third display pixel PcA emits light in a green wavelength band. The fourth display pixel PdA emits light in a blue wavelength band.

The first pixel electrode 151*a* is provided in the first display pixel PaA. The second pixel electrode 151*b* is provided in the second display pixel PbA. The third pixel electrode 151*c* is provided in the third display pixel PcA. The fourth pixel electrode 151*d* is provided in the fourth display pixel PdA.

The second pixel electrode 151*b* is provided in the Y direction with respect to the first pixel electrode 151*a*. The third display pixel PcA is provided in the X direction with respect to the first pixel electrode 151*a*. The fourth pixel electrode 151*d* is provided in the Y direction with respect to the third display pixel PcA and is provided in the X direction with respect to the second pixel electrode 151*b*.

Figure 7:
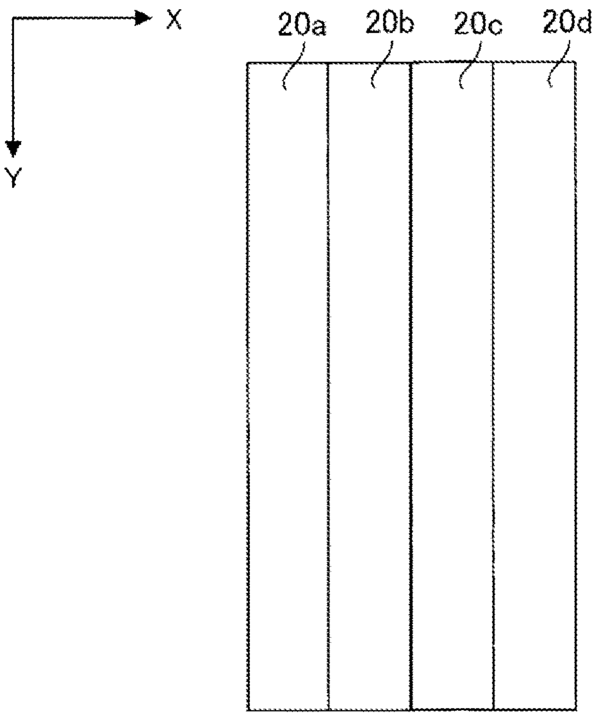
FIG. 7 is a layout diagram of four transistor circuits corresponding to four display pixels in FIG. 6.

FIG. 7 is a layout diagram of four transistor circuits 20 corresponding to the four display pixels P0 shown in FIG. 6. In FIG. 7, the first transistor circuit 20*a*, the second transistor circuit 20*b*, the third transistor circuit 20*c*, and the fourth transistor circuit 20*d* are shown as the four transistor circuits 20. The first transistor circuit 20*a* corresponds to the first display pixel PaA. The second transistor circuit 20*b* corresponds to the second display pixel PbA. The third transistor circuit 20*c* corresponds to the third display pixel PcA. The fourth transistor circuit 20*d* corresponds to the fourth display pixel PdA.

The first transistor circuit 20*a*, the second transistor circuit 20*b*, the third transistor circuit 20*c*, and the fourth transistor circuit 20*d* are arranged in order in the X direction.

Although not shown in detail, the first transistor circuit 20*a* and the second transistor circuit 20*b* overlap the first display pixel PaA and the second display pixel PbA in a plan view. With such an arrangement, the problem of an electrical coupling path between the first transistor circuit 20*a* and the first pixel electrode 151*a* becoming excessively long and excessively complicated is inhibited. Also, the same applies to the second transistor circuit 20*b*. In addition, although not shown in detail, the third transistor circuit 20*c* and the fourth transistor circuit 20*d* overlap the third display pixel PcA and the fourth display pixel PdA in a plan view. With such an arrangement, the problem of an electrical coupling path between the third transistor circuit 20*c* and the third pixel electrode 151*c* becoming excessively long and excessively complicated is inhibited. Also, the same applies to the fourth transistor circuit 20*d*.

In this embodiment, the four display pixels P0 are arranged in two rows and two columns, whereas the four transistor circuits 20 are arranged in one row and four columns. Further, the gate of the first selection transistor 17*a*, the gate of the second selection transistor 17*b*, the gate of the third selection transistor 17*c*, and the gate of the fourth selection transistor 17*d* are electrically coupled to the same scanning line 11*p*.

According to this embodiment, similarly to the first embodiment, the number of transistor circuits 20 arranged in the column direction can be halved as compared to the number of pixel electrodes 151 arranged in the column direction. That is, the number of transistor circuits 20 arranged can be halved as compared to the number of display pixels P0 arranged. Specifically, the number of transistor circuits 20 arranged in the row direction is twice larger than the number of display pixels P0 arranged. According to the configuration of this embodiment, one horizontal scanning period H can be secured to be twice longer than one horizontal scanning period H in known art. Thus, deterioration in display quality due to shortening of one horizontal scanning period H can be inhibited.

In addition, in this embodiment, the first pixel electrode 151*a*, the second pixel electrode 151*b*, the third pixel electrode 151*c*, and the fourth pixel electrode 151*d* form one pixel P that forms one dot in color display. Thus, the first to fourth transistor circuit 20*a* to 20*d* corresponding to one pixel P are arranged in one row, and each gate of the first to fourth transistor circuit 20*a* to 20*d* is electrically coupled to the scanning line 11*p*. Even when four display pixels P0 of one pixel P are arranged in two rows and two columns as in this embodiment, the number of transistor circuits 20 arranged in the column direction can be halved as compared to the number of pixel electrodes 151 arranged in the column direction. Accordingly, as described above, one horizontal scanning period H can be secured to be twice longer than one horizontal scanning period H in known art. Thus, deterioration in display quality can be inhibited.

C: Third Embodiment

A third embodiment will be described. Also, in each of the following examples, the reference numerals used in the description of the first embodiment will be used for elements whose functions are similar to those in the first embodiment, and each detailed description thereof will be appropriately omitted.

This embodiment is different from the first embodiment in the combination of the display pixels P0 included in one pixel P. In this embodiment, for example, monochrome display is performed.

Figure 8:
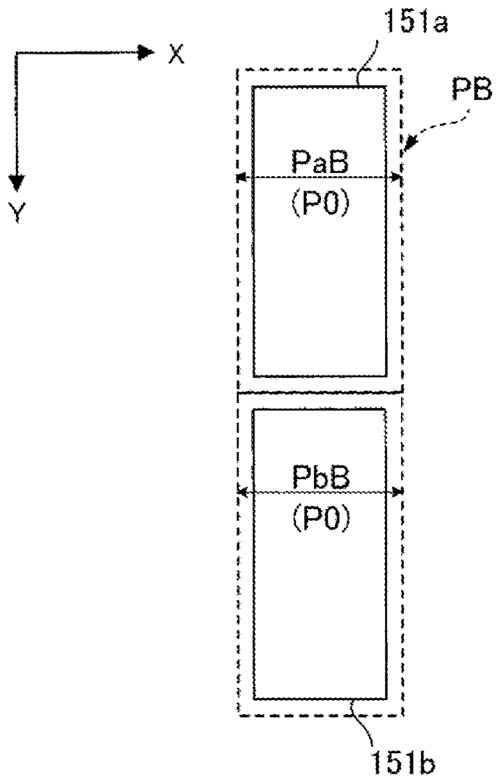
FIG. 8 is a diagram showing one pixel of a third embodiment.

FIG. 8 is a diagram showing one pixel P in the third embodiment. Also, FIG. 8 shows one arbitrary pixel PB among the plurality of pixels P. As shown in FIG. 8, the pixel PB includes two display pixels P0. Specifically, the pixel PB includes a first display pixel PaB and a second display pixel PbB. For example, the first display pixel PaB and the second display pixel PbB emit light in a wavelength band of the same color.

The first pixel electrode 151*a* is provided in the first display pixel PaB. The second pixel electrode 151*b* is provided in the second display pixel PbB. The second pixel electrode 151*b* is provided in the Y direction with respect to the first pixel electrode 151*a*.

Figure 9:
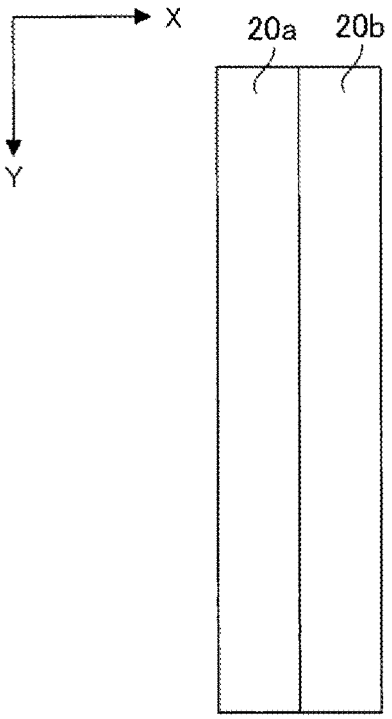
FIG. 9 is a layout diagram of two transistor circuits corresponding to two display pixels of FIG. 8.

FIG. 9 is a layout diagram of two transistor circuits 20 corresponding to the two display pixels P0 shown in FIG. 8. In FIG. 9, the first transistor circuit 20*a* and the second transistor circuit 20*b* are shown as the two transistor circuits 20. The first transistor circuit 20*a* corresponds to the first display pixel PaB. The second transistor circuit 20*b* corresponds to the second display pixel PbB.

The first transistor circuit 20*a* and the second transistor circuit 20*b* are arranged in order in the X direction. Although not shown in detail, the first transistor circuit 20*a* and the second transistor circuit 20*b* overlap the first display pixel PaB and the second display pixel PbB in a plan view. With such an arrangement, the problem of an electrical coupling path between the first transistor circuit 20*a* and the first pixel electrode 151*a* becoming excessively long and excessively complicated is inhibited. Similarly, the problem of an electrical coupling path between the second transistor circuit 20*b* and the second pixel electrode 151*b* becoming excessively long and excessively complicated is inhibited.

In this embodiment, similarly to the first embodiment, the arrangement direction of the first transistor circuit 20*a* and the second transistor circuit 20*b* intersects the arrangement direction of the first pixel electrode 151*a* and the second pixel electrode 151*b*. Further, in this embodiment, the two display pixels P0 are arranged in two rows and one column, whereas the two transistor circuits 20 are arranged in one row and two columns. In addition, the gate included in the first selection transistor 17*a* and the gate included in the second selection transistor 17*b* are electrically coupled to the same scanning line 11*p*.

According to this embodiment, similarly to the first embodiment, the number of transistor circuits 20 arranged in the column direction can be halved as compared to the number of pixel electrodes 151 arranged in the column direction. That is, the number of transistor circuits 20 arranged can be halved as compared to the number of display pixels P0 arranged. According to the configuration of this embodiment, one horizontal scanning period H can be secured to be twice longer than one horizontal scanning period H in known art. Thus, deterioration in display quality due to shortening of one horizontal scanning period H can be inhibited.

In addition, in this embodiment, the first pixel electrode 151*a* and the second pixel electrode 151*b* form one pixel P that forms one dot in color display. Even when two display pixels P0 included in one pixel P are arranged in two rows and one column, gates of the two transistor circuits 20 corresponding to the two display pixels P0 are electrically coupled to one scanning line 11*p*. According to such a configuration, as described above, the number arranged in the row direction can be halved. Accordingly, as described above, one horizontal scanning period H can be secured to be twice longer than one horizontal scanning period H in known art. Thus, deterioration in display quality can be inhibited.

D. Modified Examples

The embodiments exemplified above may be modified in various ways. Specific modified aspects that may be applied to the above-described embodiments will be exemplified below. Two or more aspects arbitrarily selected from the following examples may be combined as appropriate within a range in which they do not contradict each other.

The arrangements of the display pixels P0 in the above-described embodiments are examples, and other arrangements may be used. For example, a so-called PenTile arrangement or the like may be used.

In the above-described embodiment, the two transistor circuits 20 overlap the two display pixels P0 in a plan view. However, three or more transistor circuits 20 may overlap three or more display pixels P0 in a plan view. In this case, three or more transistor circuits 20 corresponding to three or more display pixels P0 arranged in the Y direction are arranged in the X direction. In addition, gates of the selection transistors 17 included in the three transistor circuits 20 are electrically coupled to the same scanning line 11*p*. According to this configuration, the number of transistor circuits 20 arranged can be reduced to ⅓ or less of the number of display pixels P0 arranged. According to such a configuration, one horizontal scanning period H can be secured to be three times or more of one horizontal scanning period H in known art.

However, a configuration in which two transistor circuits 20 overlap two display pixels P0 in a plan view and gates of selection transistors 17 included in the two transistor circuits 20 corresponding to the two display pixels P0 are electrically coupled to the same scanning line 11*p* is optimal. The number of wirings of the data lines 12 does not become excessively dense, and deterioration in display quality due to shortening of one horizontal scanning period H can be inhibited.

In the above-described embodiments, the light emitting element 15 is an OLED. However, for example, the light emitting element 15 may be an LED, a mini LED, a micro LED, or the like. LED is an abbreviation for Light emitting Diode.

E. Electronic Devices

The display device 1 of each of the above-described embodiments or modified examples can be applied to various electronic devices. The display device 1 according to the above-described embodiments is particularly suitable for electronic devices that are required to display high-definition images of 2K2K or higher and are required to be compact.

Figure 10:
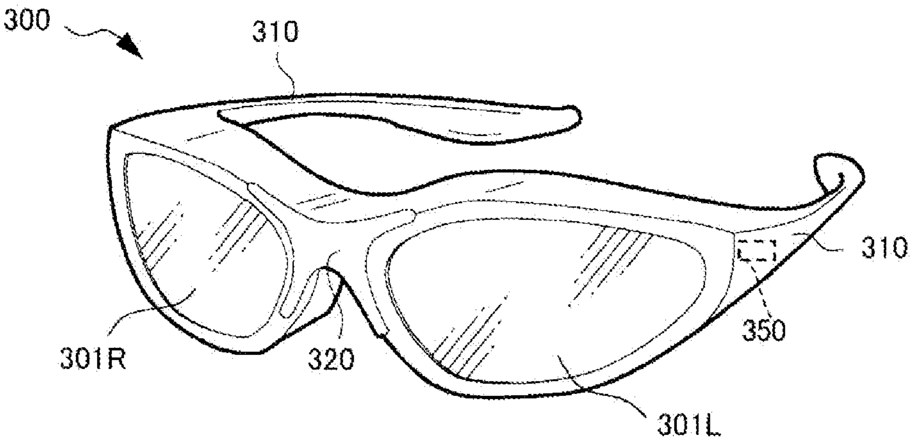
FIG. 10 is a perspective view showing an outer shape of a head-mounted display serving as an electronic device including the display device.
Figure 11:
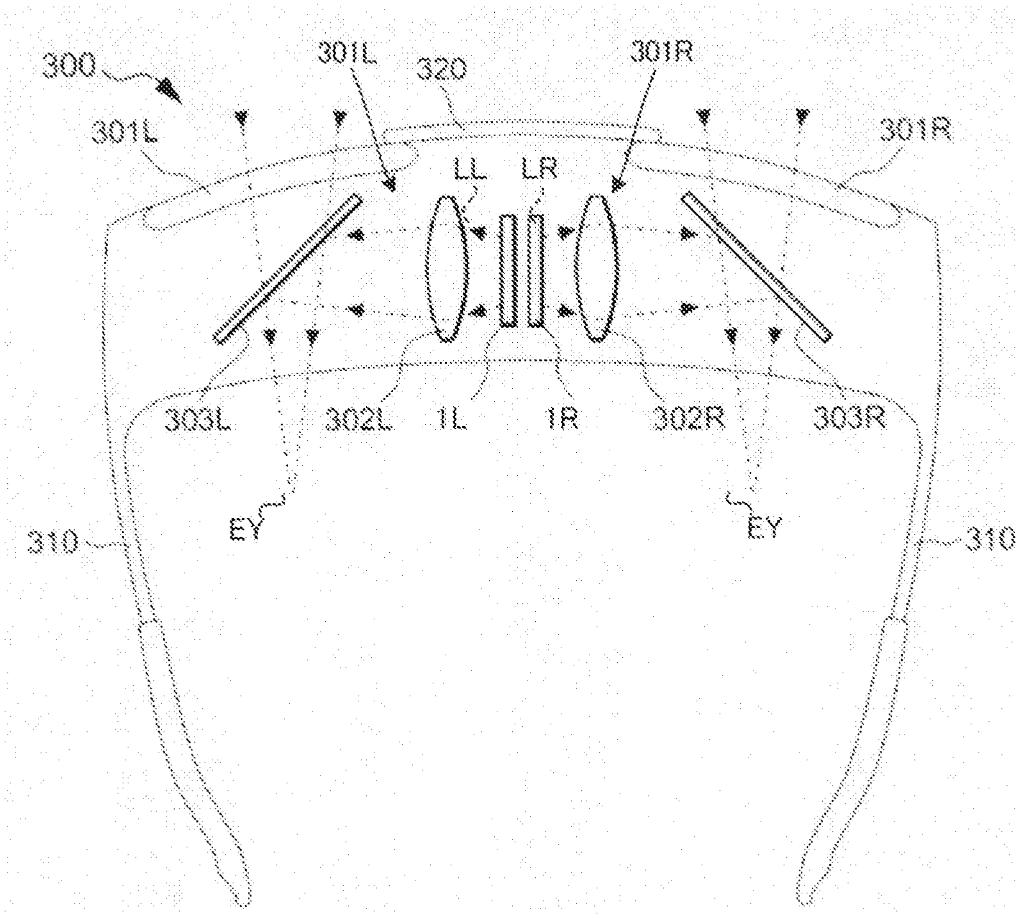
FIG. 11 is a diagram of an optical configuration of the head-mounted display shown in FIG. 10.

FIG. 10 is a perspective view showing an outer shape of a head-mounted display 300 serving as an electronic device. FIG. 11 is a diagram of an optical configuration of the head-mounted display 300 shown in FIG. 10. In FIG. 11, the display device 1 for the left eye will be denoted as a display device 1L, and the display device 1 for the right eye will be denoted as a display device 1R.

As shown in FIG. 10, the head-mounted display 300 includes temples 310, a bridge 320, a projection optical system 301L, a projection optical system 301R, and a control unit 350. Also, as shown in FIG. 11, the head-mounted display 300 includes the two display devices 1. The control unit 350 includes, for example, a processor and a memory, and controls operations of the two display devices 1.

Image light LL formed by the display device 1L is radiated to the projection optical system 301L. The projection optical system 301L includes an optical lens 302L and a half mirror 303L. The image light LL is radiated toward the half mirror 303L via the optical lens 302L. Some of the image light LL is reflected by the half mirror 303L and is projected to a pupil EY of a wearer of the head-mounted display 300. Also, some of the image light LL is transmitted through the half mirror 303L. Similarly, image light LR formed by the display device 1R is radiated to the projection optical system 301R. The projection optical system 301R includes an optical lens 302R and a half mirror 303R. The image light LR is radiated toward the half mirror 303L via the optical lens 302R. Some of the image light LR is reflected by the half mirror 303R and is projected to a pupil EY of the wearer of the head-mounted display 300. Also, some of the image light LR is transmitted through the half mirror 303R.

The wearer of the head-mounted display 300 can visually recognize an image formed by the image light LL and the image light LR while visually recognizing an external world image.

The head-mounted display 300 includes the above-described display devices 1 and the control unit 350. According to the display devices 1, deterioration in display quality can be inhibited. Accordingly, the head-mounted display 300 includes the display devices 1, and thus deterioration in display quality of the head-mounted display 300 can be inhibited.

Also, examples of the electronic device to which the above-described display device is applied include, in addition to the head-mounted display 300, an electronic device disposed close to the eyes, such as a digital scope, digital binoculars, a digital still camera, and a video camera. Further, it can be applied as a display unit provided in an electronic device such as a displayer or the like of a mobile phone, a smartphone, a smart watch, a personal digital assistant (PDA), a car navigation device, and an in-vehicle instrument panel. In addition, the display device 1 is applicable to a light bulb of a projection type projector.

Although the present disclosure has been described above based on the illustrated embodiments and modified examples, the present disclosure is not limited thereto. In addition, the configuration of each part of the present disclosure may be replaced with any configuration that exhibits the same function as in the embodiments described above, or any configuration can be added.

What is claimed is:

1. A display device comprising:

a scanning line extending in a first direction;

a first data line and a second data line that extend in a second direction intersecting the first direction and that are arranged in the first direction;

a first transistor circuit;

a second transistor circuit;

a first light emitting element including a first pixel electrode; and a second light emitting element including a second pixel electrode, wherein the first transistor circuit includes a first drive transistor configured to supply the first pixel electrode with a first drive current based on a potential corresponding to a first video signal from the first data line, and a first selection transistor configured to electrically couple the first data line to the first drive transistor, the second transistor circuit includes a second drive transistor configured to supply the second pixel electrode with a second drive current based on a potential corresponding to a second video signal from the second data line, and a second selection transistor configured to electrically couple the second data line to the second drive transistor, the first pixel electrode and the second pixel electrode are arranged in the second direction, the first transistor circuit and the second transistor circuit are arranged in the first direction, and a gate included in the first selection transistor and a gate included in the second selection transistor are electrically coupled to the scanning line.

2. The display device according to claim 1 further comprising:

a third data line and a fourth data line that extend in the second direction and that are arranged in the first direction;

a third transistor circuit;

a fourth transistor circuit;

a third light emitting element including a third pixel electrode; and a fourth light emitting element including a fourth pixel electrode, wherein the third transistor circuit includes a third drive transistor configured to supply the third pixel electrode with a third drive current based on a potential corresponding to a third video signal from the third data line, and a third selection transistor configured to electrically couple the third data line to the third drive transistor, the fourth transistor circuit includes a fourth drive transistor configured to supply the fourth pixel electrode with a fourth drive current based on a potential corresponding to a fourth video signal from the fourth data line, and a fourth selection transistor configured to electrically couple the fourth data line to the fourth drive transistor, the third pixel electrode is provided in the first direction with respect to the first pixel electrode, the fourth pixel electrode is provided in the first direction with respect to the second pixel electrode and is provided in the second direction with respect to the third pixel electrode, the third transistor circuit and the fourth transistor circuit are arranged in the first direction, and a gate included in the third selection transistor and a gate included in the fourth selection transistor are electrically coupled to the scanning line.

3. The display device according to claim 2 further a fifth data line and a sixth data line that extend in the second direction and that are arranged in the first direction;

a fifth transistor circuit;

a sixth transistor circuit;

a fifth light emitting element including a fifth pixel electrode; and a sixth light emitting element including a sixth pixel electrode, wherein the fifth transistor circuit includes a fifth drive transistor configured to supply the fifth pixel electrode with a fifth drive current based on a potential corresponding to a fifth video signal from the fifth data line, and a fifth selection transistor configured to electrically couple the fifth data line to the fifth drive transistor, the sixth transistor circuit includes a sixth drive transistor configured to supply the sixth pixel electrode with a sixth drive current based on a potential corresponding to a sixth video signal from the sixth data line, and a sixth selection transistor configured to electrically couple the sixth data line to the sixth drive transistor, the fifth pixel electrode is provided in the first direction with respect to the third pixel electrode, the sixth pixel electrode is provided in the first direction with respect to the fourth pixel electrode and is provided in the second direction with respect to the fifth pixel electrode, the fifth transistor circuit and the sixth transistor circuit are arranged in the first direction, a gate included in the fifth selection transistor and a gate included in the sixth selection transistor are electrically coupled to the scanning line, the first pixel electrode, the third pixel electrode, and the fifth pixel electrode are provided in a first pixel forming one dot in color display, and the second pixel electrode, the fourth pixel electrode, and the sixth pixel electrode are provided in a second pixel forming another dot in the color display.

4. The display device according to claim 2, wherein the first pixel electrode, the second pixel electrode, the third pixel electrode, and the fourth pixel electrode are provided in one pixel forming one dot in the color display.

5. An electronic device comprising:

the display device according to claim 1; and a control unit configured to control an operation of the display device.

* * * * *